Dec. 30, 1969     C. P. AFANADOR     3,486,593
HYDRAULIC DISK BRAKE WITH ANTI-KNOCK BACK FEATURE
Filed June 20, 1967
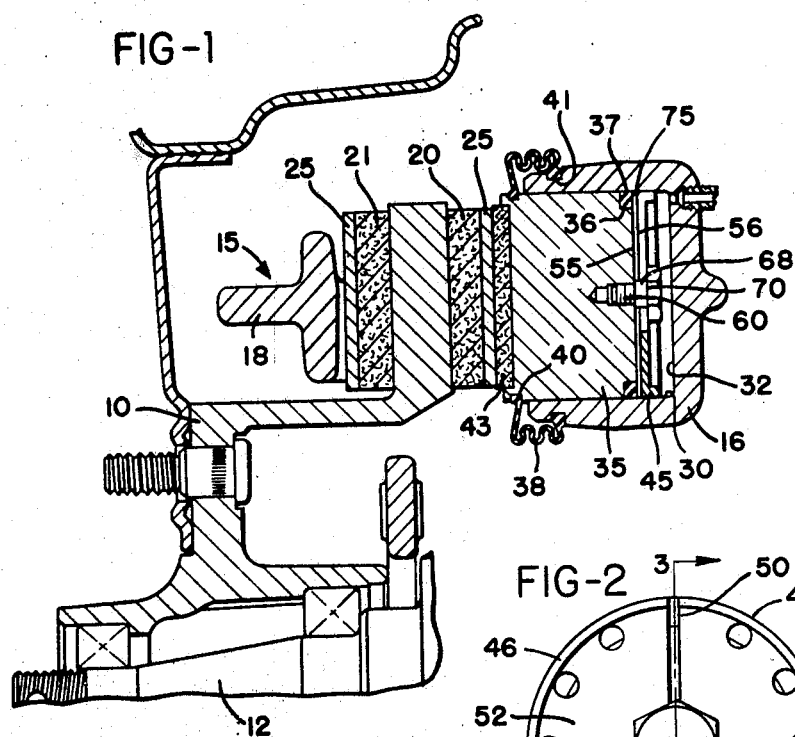
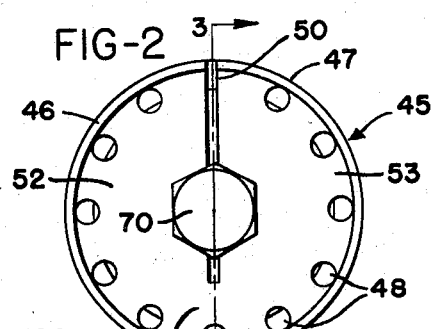
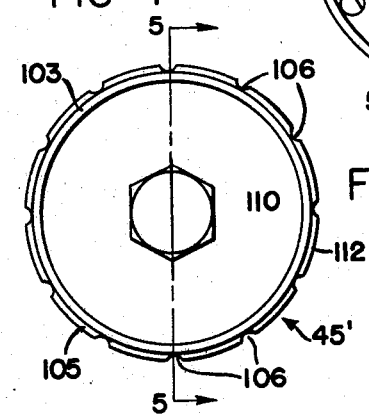
INVENTOR
CARLOS P. AFANADOR
BY
*Marechal, Biebel, French & Bugg*
ATTORNEYS

United States Patent Office 3,486,593
Patented Dec. 30, 1969

3,486,593
HYDRAULIC DISK BRAKE WITH ANTI-KNOCK BACK FEATURE
Carlos P. Afanador, Centerville, Ohio, assignor to The Dayton Steel Foundry Company, Dayton, Ohio, a corporation of Ohio
Filed June 20, 1967, Ser. No. 647,455
Int. Cl. F16d 65/38, 55/224
U.S. Cl. 188—196                    10 Claims

ABSTRACT OF THE DISCLOSURE

A hydraulic disk brake with an interposed disk-like friction member positioned inwardly of the piston in frictional engagement with the cylinder bore to prevent knock-back of the piston into the cylinder.

RELATED APPLICATION

This application is a continuation-in-part of application Serial No. 570,781, filed Aug. 8, 1966 entitled Hydraulic Disk Brake With Anti-Knock Back Feature, assigned to the same assignee as this invention now abandoned.

BACKGROUND OF THE INVENTION

This invention relates to hydraulic disk brakes and more particularly to disk brakes and hydraulic piston assemblies for disk brakes which prevent excessive knock back of the piston within the cylinder bore.

Hydraulic disk brakes, particularly of the caliper or "spot" type, frequently have hydraulic piston assemblies which rely upon the runout or eccentricity of the disk in order to move the piston back into its cylinder following the release of the brakes, to eliminate a dragging condition and to reestablish a running clearance. In such units, the hydraulic piston may be relatively loosely fitted within its associated cylinder cup and sealed therein with means of any suitable sealing ring or the like. While this simple arrangement has been effective, particularly on light weight applications such as on sports cars, it has not been sufficient for use with disk brakes designed for use with heavier loads and higher stopping torques. These have often employed fully automatic adjusting units of the types shown in the patents of Dotto 3,064,768 and 3,064,765 assigned to the same assignee of this invention, to assure the maintenance of a constant running clearance for the brake pads and the disk.

While such fully automatic adjuster units have proved quite successful, and in many cases offer superior results in maintaining an assured running clearance over a wide variety of operating conditions, it may not always be desirable to use such fully automatic adjusters, particularly where the added cost of these adjusters cannot be justified.

However, in many of such brakes, if the adjuster is eliminated, the piston often tends to move too far back into the cylinder, so that the retraction gap becomes too great to be overcome in the next application of the brake. This may happen, for example, when the vehicle on which the brake is mounted is driven for some period of time over a rough road, or where vibrations or other forces applied to the caliper housing cause the housing to vibrate or oscillate rapidly in such a manner that, over a period of time or distance, the piston creeps inwardly into the cylinder. Instantaneous loading on the piston may go as high as 100 g's. This condition is known in the art as "knock back," although the original knock back is caused by run-out or lateral movement of the disk during the first few revolutions following the release of the brakes.

The original or first knock back caused by the disk, as outlined above, is desirable, and is caused by direct contact of the disk against the adjacent pad and, in turn, against the hydraulic force applying assembly, may be used to reestablish a normal running clearance without a retraction spring. However, once a clearance has been established, the more room the piston has in which to vibrate or move, and the more rapidly it may vibrate or creep into an excessively retracted position. In a short time, the pistons of the hydraulic brakes can move inwardly into their cylinder bores to such an extent that there is simply not enough fluid displacement capacity in the master cylinder system to reestablish a braking or gripping condition when the brakes are applied for the first time. Accordingly, the situation can become very dangerous since the vehicle will simply have no operative brakes until the brakes are applied several times and the pistons moved in step-by-step manner until the excessive clearance has been eliminated.

SUMMARY OF THE INVENTION

This invention controls knock back by providing a friction abutment member which is associated with the piston and may be either rigidly or loosely attached to the piston, and having a controlled frictional engagement with the cylinder walls. The abutment member is engageable by the brake piston with inward movement of the piston toward the closed end of the cylinder bore, and has a resistance to movement which is greater than anticipated knock-back forces applicable thereto by the piston due to road vibration, shock, and the like.

Two preferred embodiments of such abutment members are shown. In one, a stamped sheet metal disk-shaped plate is received in the cylinder with a peripheral portion in direct frictional engagement with the walls of the bore, and is coupled to the piston by a loose coupling. This member may deflect slightly, when the piston is moved under the influence of hydraulic force toward the disk, to release at least a part of the frictional gripping effect with the bore. However, when the piston attempts to move inwardly toward the gripping member, this member is caused to grip the cylinder walls with greater force preventing knock-back of the piston after the retraction clearance has been taken up.

In another embodiment, a plate-like member is rigidly attached to the piston and is provided with an elastomeric frictional coupling with the cylinder walls, in which the elastic deflection of the coupling defines the retraction gap and in which the elastomer functions as a retraction spring. Further, this member also exhibits a greater friction gripping force with the cylinder walls in the knock-back direction than in the brake-applying direction, effectively preventing knock back of the piston into the cylinder bore.

It is accordingly an important object of this invention to provide a hydraulic disk brake and improved hydraulic actuating mechanisms for such brake as outlined above in which the knock back is controlled, and in which excessive knock back is effectively prevented, for establishing and maintaining a reasonable running clearance.

A further object of this invention is the provision of a hydraulic disk brake in which a knock back preventing friction member is in direct frictional engagement with walls of the same cylinder bore within which the hydraulic piston is mounted.

A still further object of this invention is the provision of a hydraulic disk brake in which a friction member is in frictional and gripping engagement with the cylinder bore of the piston, which gripping may either be direct or through a bonded block of elastomeric material. The friction member may be loosely coupled to the piston thereby defining a retraction gap, or directly coupled in the case of the embodiment employing an elastomeric gripping agent. In either case it has a sufficient gripping force with the walls of the cylinder to prevent knock back of the piston by road vibration or other forces externally induced or applied to the brake housing.

These and other objects and advantages of the present invention will be apparent from the following description, the accompanying drawings and the appended claims.

BRIEF DESCRIPTION OF VIEWS OF THE DRAWING

FIG. 1 is a vertical fragmentary section through a caliper type disk brake constructed according to one embodiment of this invention;

FIG. 2 is an end elevation of the anti-knock back plate of FIG. 1;

FIG. 3 is a vertical section of the plate of FIG. 2 taken generally along the line 3—3 of FIG. 2;

FIG. 4 is an end elevation of a modified form of the invention;

FIG. 5 is a vertical section taken generally along the line 5—5 of FIG. 4; and

FIG. 6 is an enlarged fragmentary portion of the apparatus of FIG. 5 showing the parts in a moved position.

DESCRIPTION OF PREFERRED EMBODIMENTS

Referring to the figures of the drawings which illustrate preferred embodiments of the invention, a caliper type disk brake is shown in FIG. 1 as including an annular disk 10 mounted for rotation on a relatively fixed spindle 12. The caliper housing shown generally at 15 includes a pressure portion 16 and a reaction portion 18 formed in generally encircling relation to a peripheral portion of the disk 10. A pair of friction pads are positioned on either side of the disk within the caliper housing 15 and include a first pad 20 positioned on the pressure side and a second pad 21 positioned on the reaction side.

The caliper housing 15 is mounted on pins, not shown, permitting floating or self-aligning movement in a direction parallel to the rotational axis of the disk, and may be constructed and mounted, for example, as shown in the copending U.S. application of Walther and Afanador, Ser. No. 520,343 filed Jan. 13, 1966, assigned to the same assignee as this invention, now Patent No. 3,384,203, issued May 21, 1968. The pressure pads 20 and 21 may each be provided with force and torque receiving backing plates 25, which may similarly be mounted on pins to the caliper housing for axial movement in the manner shown and described in the Walther et al. application.

The pressure portion 16 includes means defining a hydraulic piston assembly, and this may be formed either as an integral part of the pressure portion, or may be a separate bolt-on attachment as shown in the said Walther et al. application. Thus, the portion 16 includes a cylinder bore 30 which is closed at one end, such as shown at 32, and which opens toward the disk 10. A force-applying piston 35 is received within the bore 30 and is adapted for movement through the open end of the bore with the application of hydraulic fluid under pressure between it and the closed end 32 of the bore. A rear peripheral portion of the piston 35 is cut to form an L-shaped slot 36 which receives a lathe cut seal 37 in sealing relation to the bore 30.

The front of the piston 35 preferably protrudes through the open end of the bore 30, and is sealed by an annular, accordian-pleated or bellows seal 38, the inner end of which is received within a groove formed in the exposed front end 40 of the piston 35, and the rearward end of which is received within a further annular groove 41 formed in the body member or reaction portion 16.

The face of the piston 35 is recessed or counterbored to receive a block 43 of high density insulating material positioned between the piston 35 and the adjacent backing plate 25 to isolate the piston from the affects of heat generated at the disk. The block 43 also forms a force or thrust transmitting connection between the piston 35 and the adjacent pad 20.

Anti-knock back means for the hydraulic piston assembly includes a friction member or abutment 45 in the bore 30 positioned generally between the piston 35 and the closed end 32 of the bore. The friction member 45 is shown in FIGS. 2 and 3 as being generally disk or plate shaped and has an outer, axially extending peripheral lip 46. The lip 46 is formed with an outer cylindrical surface 47 which is in direct frictional engagement with the inside walls forming the bore 30. A series of openings 48 may be provided inwardly of the tip for the flow of hydraulic fluid therepast.

As shown in FIG. 2, the member 45 is preferably hot-treated sheet metal stamping formed with a generally radially extending plate-like central body portion. The member 45 is further formed with a transverse split or slot 50 extending through the peripheral lip 46 and diametrically partially through the control portion. The slot 50 therefore extends transversely and diametrically through the member 45 a distance which is somewhat greater than one-half of its diameter, thereby dividing the member into separate arcuate portions 52 and 53 connected by an integral common portion 54 of reduced dimension. The free diameter of the member 45 at the outer surface 47 is preferably slightly greater than the inside diameter of the bore 30, so that the arcuate halves 52 and 53 are slightly compressed together at the slot when positioned within the bore 30.

The member 45 therefore forms an abutment with respect to the piston 35 and, for this purpose, the piston 35 is formed with a rear abutment surface 55 which is proportioned to engage the adjacent planar surface 56 of the member 45. Loose coupling means connecting the member 45 to the piston 35 includes a single fastener bolt 60, which is threaded into an axial tapped blind opening formed into the rear face 55 of the piston 35. The bolt 60 is received through an opening 62 formed in the member 45 and is shouldered at 65 to define the extent of threaded engagement into the piston 35. The member 45 is mounted on an enlarged bolt portion 68 rearwardly of the shoulder 65 between an enlarged end or head 70 of the bolt and the rear planar surface of the piston 35. The axial space between the inside surface of the head 70 of the bolt and the rear surface 55 of the piston 35 is somewhat greater than the thickness axial of the member 45. This difference in dimension defines the maximum knock back retraction gap or clearance 75.

Preferably, the retraction gap 75 is in excess of the static deflection of the caliper housing 15 when subjected to high loads. Therefore, elastic deflection of the housing cannot result in loss of retraction clearance. However, the retraction gap established thereby is not so great that it cannot be conveniently taken up by the hydraulic brake system with the application of the brakes. That is to say, it does not exceed the normal capacity of the master cylinder to reestablishh a full braking condition whenever desired.

Normally the piston 35 will run with between .010" and .015" clearance, for example, due to the initial knock back caused by the disk run-out. This run-out may be caused by eccentricity in the disk or by bending loads on the axle spindle, or both. The gap may be chosen, for example, at .025" in the example given but may be more or less than this, depending upon the capacity of the hydraulic master cylinder safely to take up this clearance and still apply full braking forces to the pads, taking into account the elastic static deflection of the caliper housing under such stress.

The plate member 45, being formed with an outside diameter which is slightly greater than the corresponding bore 30 of the cylinder, has a frictional gripping relation with the cylinder. This gripping relation is not equal for movement in each direction without the bore, as can be more fully explained by reference to FIG. 3. When the piston moves toward the disk, such as during the application of the brake, the head 70 of the bolt 60 engages the frictional member 45 substantially at the central portion thereof, causing it to deflect slightly, as shown in exaggerated form by broken lines in FIG. 3. This deflection is due to the fact that the member 45 is slightly flexible, since it is preferably formed of sheet material stamping, and results in the loosening of the grip of the member 45 with respect to the bore 30, by the slight inward deflection of the peripheral lip 46. As a result, the member 45 may require a force of only 200 pounds in order to move it in the direction away from the closed end 32 of the cylinder bore 30.

However, the member 45 is substantially more effective in preventing knock-back by reason of the abutment of the planar surface 55 of the piston against the corresponding surface 56 of the member 45. For example, the friction member 45 may require approximately 700 pounds force to move it toward the closed end of the cylinder bore. In this manner, the member 45 provides relatively low drag in the direction of piston movement with the application of hydraulic force, which drag can be readily overcome. Whenever it is needed to move the piston 35 to a new running position, such as would occur with wear of the brake lining by stepping hard on the brakes, a pressure of 1,000 to 2,000 p.s.i. can readily be obtained. This pressure is obviously more than sufficient to move the piston 35 and the coupled member 45 to new relative positions within the bore 30. However, the substantially greater force required to move the member 45 inwardly within the bore effectively prevents the piston 35 from being knocked back into the bore, such as by vibration, road shock, or the like, beyond that defined by the retraction gap 75.

A modified form of the invention is shown in FIGS. 4–6, in which the friction member 45' is formed with a stamped plate-like body 100 having a central opening 102, and an outer, axially-turned peripheral lip 103 which has a diameter somewhat less than the bore 30. The peripheral lip 103 supports thereon a substantially continuous ring 105 of elastomeric material, which is peripherally bonded or vulcanized in position on the lip. The ring 105 may thus be formed of an elastomer suitable for use with automotive types of brake fluid, with a durometer hardness of 80–90 Shore A. The peripheral outer edge of the ring 105 may be formed with recesses or scallops 106 (FIG. 4) to provide passageways for the flow of hydraulic fluid therepast.

The member 45 of FIGS. 4–6 is preferably rigidly connected to the back surface 55 of the piston 35 by a bolt 110 without any cap, as shown in FIG. 5. However, it may be loosely coupled in the manner of the member 45. The outer surface 112 of the ring 105 (FIG. 6) forms a frictional connection with the cylindrical bore 30 and is formed with a diameter slightly greater than that of the bore 30. The ring 105 is formed with a sufficient thickness, for example in the order of .040 to .045 of an inch, so that during forward movement of the piston 45, the ring 105 is placed in shear, substantially as shown in FIG. 6, prior to slippage in the bore. In this condition, the outer peripheral surface 112 may be displaced approximately .030 of an inch from its normal position, defining a retraction gap 115 (FIG. 6). Greater shear may be obtained by using a greater thickness of ring material. When the hydraulic fluid pressure is released, the ring 105 assumes its original position as shown in FIG. 5, thereby retracting the piston 35 through the gap 115.

It will be seen that due to the abutment of the plate 100 directly against the piston 35, substantially little if any corresponding shear is possible in the material of the ring 105 by movement in the reverse direction. Thus, an effect is achieved corresponding to the deflection of the member 45, with a substantially lower force being required to overcome the frictional gripping of the ring 105 with respect to the bore 30 in the brake applying direction than that required in the knock-back direction. Also, the ring may either be continuous, as shown, or may be found in segments or in blocks of elastomeric material.

The invention accordingly provides simplified, low-cost and dependable hydraulic force applying assemblies for disk brakes. No additional borings or specially machined openings need be provided within the body other than the cylinder bore for the piston itself. The assemblies are low in cost and relatively simple to manufacture, and are dependable in operation.

While the forms of apparatus herein described constitute preferred embodiments of the invention, it is to be understood that the invention is not limited to these precise forms of apparatus, and that changes may be made therein without departing from the scope of the invention.

What is claimed is:

1. In a hydraulic disk brake, the improvement in hydraulic piston actuating mechanism providing a maximum retraction clearance of controlled dimension and preventing piston knock back into a condition of excessive retraction clearance, comprising a hydraulic piston support, means in said support defining a cylinder bore closed across one end thereof, a piston received within said bore and adapted for movement through said open end for applying a braking force with the application of hydraulic fluid under pressure between said piston and the closed end of said bore, means sealing said piston in said bore, a friction abutment member in said bore between said piston and said closed end and having a peripheral portion in frictional but non-sealing engagement with the walls of said bore and being engageable with said piston with inward movement of said piston toward said closed end, said member having a resistance to movement which exceeds the maximum knock back force applicable thereto by said piston due to vibration and road shock, and coupling means connecting said piston to said member.

2. The brake of claim 1 in which said member is generally disk-shaped having an axially extending peripheral portion in frictional engagement with said bore and generally a radially extending body portion, and having means defining a transverse slot extending partially diagonally thereacross through said body portion with the outside free diameter of said member at said peripheral portion being slightly greater than the diameter of said bore so that said member is slightly compressed at said slot when received within said bore.

3. The brake of claim 2 in which said coupling means comprises a single fastener supported on said piston and having an enlarged head positioned inwardly into said bore in spaced relation to said piston, and said member is generally disk-shaped and has a central portion received for limited sliding movement on said fastener between said piston and said head.

4. The brake of claim 1 in which said abutment member is a sheet metal stamping having an axially aligned peripheral lip in frictional engagement with said bore and which is deflectable by movement of said piston toward said open end partially to partially release the gripping effect of said lip with said bore.

5. The brake of claim 1 in which said abutment member is formed with elastomeric material at a peripheral edge in frictional engagement with said bore, said material being deflectable in shear with movement of said piston toward said bore open end defining with said piston a retraction gap.

6. The brake of claim 5 in which said member further comprises a disk-shaped plate and in which said material is bonded peripherally to said plate forming an elastomeric ring in frictional engagement with said bore, and in which said coupling means secures said plate to said piston.

7. An improved anti-knock back hydraulic piston assembly for a disk brake, comprising a body, means in said body defining a cylinder bore which is open at one end and closed at the other end, a piston slidably received on said bore, means defining an anti-knock back friction member in said bore positioned between said piston and the closed end of said bore including plate means mounted effectively on the rear face of said pistion, said member having means defining a peripheral portion in direct frictional engagement with the inside walls of said body at said bore and having a gripping engagement with said bore sufficient to resist piston movement axially in said bore with a force which exceeds the knock back force of said piston due to vibration and road shock, means connecting said piston to said member, and the said frictional gripping force of said member with said walls being easily overcome by the brake applying force of said piston with the application of hydraulic pressure to the space between said piston and said closed end.

8. The piston assembly of claim 7 in which said member is generally disk-shaped and has means therein defining a diametrically transverse split extending partially thereacross with a free outside diameter which is slightly in excess of the diameter of said bore so that said member is compressed at said slot when received within said bore, and said connecting means includes a threaded fastener extending through said member with an enlarged head received inwardly of said member and being spaced from said piston by an amount which exceeds the axial thickness of said member defining therebetween a maximum knock back clearance gap.

9. The piston assembly of claim 7 in which said member peripheral portion includes a quantity of elastomeric material supported in frictional engagement with said bore and being deflectable in shear with movement of said piston toward said open end by an amount corresponding to a retraction gap for returning said piston upon the release of hydraulic pressure and being thereafter slidable by said piston in said bore providing for adjusting movement of said piston and having a greater resistance to piston movement inwardly than outwardly of said bore preventing knock back of said piston in said bore beyond that defined by said retraction gap.

10. An improved hydraulic piston assembly for a disk brake subject to road shock and vibration in which a hydraulic piston moves in a cylindrical bore formed in a housing for applying a braking force to a pad of friction material and in which said road shock and vibration tend to move said piston inwardly in said bore away from said pad, comprising hydraulic seal means sealing said piston in said bore, means on said piston defining an annular support with a peripheral portion spaced radially inwardly of said bore, and a quantity of elastomeric material supported on said peripheral portion at a location on said piston inwardly of said seal means and in frictional engagement with said bore, said frictional engagement being substantial to oppose inward movement of said piston for effectively resisting said knock back forces, said material being further deflectable in shear with braking movement of said piston forming an integral retraction spring by effecting the return of said piston to its initial position upon release of hydraulic pressure, with said frictional engagement thereof with said bore being substantially less when the piston is moved toward said pad so that said material may readily be repositioned as necessary with respect to said bore by braking movement of said piston.

References Cited

UNITED STATES PATENTS

| | | |
|---|---|---|
| 3,377,076 | 4/1968 | Burnett. |
| 3,200,911 | 8/1965 | Rumelin. |
| 3,269,491 | 8/1966 | Belart et al. |
| 3,338,354 | 8/1967 | Jeffries. |

DUANE A. REGER, Primary Examiner

U.S. Cl. X.R.

188—73